United States Patent
Kowalczyk et al.

(10) Patent No.: US 7,945,137 B2
(45) Date of Patent: *May 17, 2011

(54) FIBER OPTIC CONNECTOR HOLDER

(75) Inventors: Scott Kowalczyk, Savage, MN (US);
Joy K. McKnight, Carver, MN (US)

(73) Assignee: ADC Telecommunications, Inc., Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 12/507,292

(22) Filed: Jul. 22, 2009

(65) Prior Publication Data

US 2009/0285541 A1    Nov. 19, 2009

Related U.S. Application Data

(63) Continuation of application No. 11/190,511, filed on Jul. 26, 2005, now Pat. No. 7,583,883.

(51) Int. Cl.
*G02B 6/00* (2006.01)
(52) U.S. Cl. ......... 385/135; 385/134; 385/136; 385/137
(58) Field of Classification Search .................. 385/134, 385/135, 136, 137
See application file for complete search history.

(56) References Cited

U.S. PATENT DOCUMENTS

| | | | |
|---|---|---|---|
| 5,317,663 A | 5/1994 | Beard et al. | |
| 5,647,043 A | 7/1997 | Anderson et al. | |
| 6,347,888 B1 | 2/2002 | Puetz | |
| 6,409,392 B1 | 6/2002 | Lampert et al. | |
| 6,983,095 B2 | 1/2006 | Reagan et al. | |
| 7,088,899 B2 | 8/2006 | Reagan et al. | |
| 7,103,255 B2 | 9/2006 | Reagan et al. | |
| 7,146,089 B2 | 12/2006 | Reagan et al. | |
| 7,171,102 B2 | 1/2007 | Reagan et al. | |
| 7,198,409 B2 | 4/2007 | Smith et al. | |
| 7,200,317 B2 | 4/2007 | Reagan et al. | |
| 7,218,827 B2 | 5/2007 | Vongseng et al. | |
| 7,233,731 B2 | 6/2007 | Solheid et al. | |
| 7,277,620 B2 | 10/2007 | Vongseng et al. | |
| 7,369,741 B2 | 5/2008 | Reagan et al. | |
| 7,400,816 B2 | 7/2008 | Reagan et al. | |
| 7,407,330 B2 | 8/2008 | Smith et al. | |
| 7,583,883 B2 * | 9/2009 | Kowalczyk et al. | 385/134 |
| 2003/0223703 A1 | 12/2003 | Chen et al. | |

(Continued)

FOREIGN PATENT DOCUMENTS

EP    0 597 501 A1    5/1994
(Continued)

OTHER PUBLICATIONS 24 photos of LambdaUnite® Blank Card; "LambdaUnite® MultiService Switch (MSS)" brochure (2003); and "Lucent's LambdaUnite® Busts Out" official release (Jan. 29, 2002).

*Primary Examiner* — Jennifer Doan
(74) *Attorney, Agent, or Firm* — Merchant & Gould P.C.

(57) ABSTRACT

A fiber optic connector holder including a housing with at least one cavity for receiving a fiber optic connector with a dust cap in place about a terminal end of the connector. The housing may be integrally molded with retaining structures for releasably engaging the fiber optic connector and releasable catches for mounting the housing at a mount location. The presence of a fiber optic connector within a cavity of the housing may prevent the removal of the housing from a mounting location.

20 Claims, 10 Drawing Sheets

U.S. PATENT DOCUMENTS

| | | |
|---|---|---|
| 2005/0002633 A1 | 1/2005 | Solheid et al. |
| 2008/0008436 A1 | 1/2008 | Reagan et al. |
| 2008/0013910 A1 | 1/2008 | Reagan et al. |
| 2008/0019655 A1 | 1/2008 | Vongseng et al. |
| 2008/0025684 A1 | 1/2008 | Vongseng et al. |
| 2008/0075411 A1 | 3/2008 | Solheid et al. |
| 2008/0317425 A1 | 12/2008 | Smith et al. |
| 2009/0074372 A1 | 3/2009 | Solheid et al. |
| 2009/0087157 A1 | 4/2009 | Smith et al. |

FOREIGN PATENT DOCUMENTS

| | | |
|---|---|---|
| JP | 2001-188134 | 7/2001 |
| JP | 2005-345589 | 12/2005 |

* cited by examiner

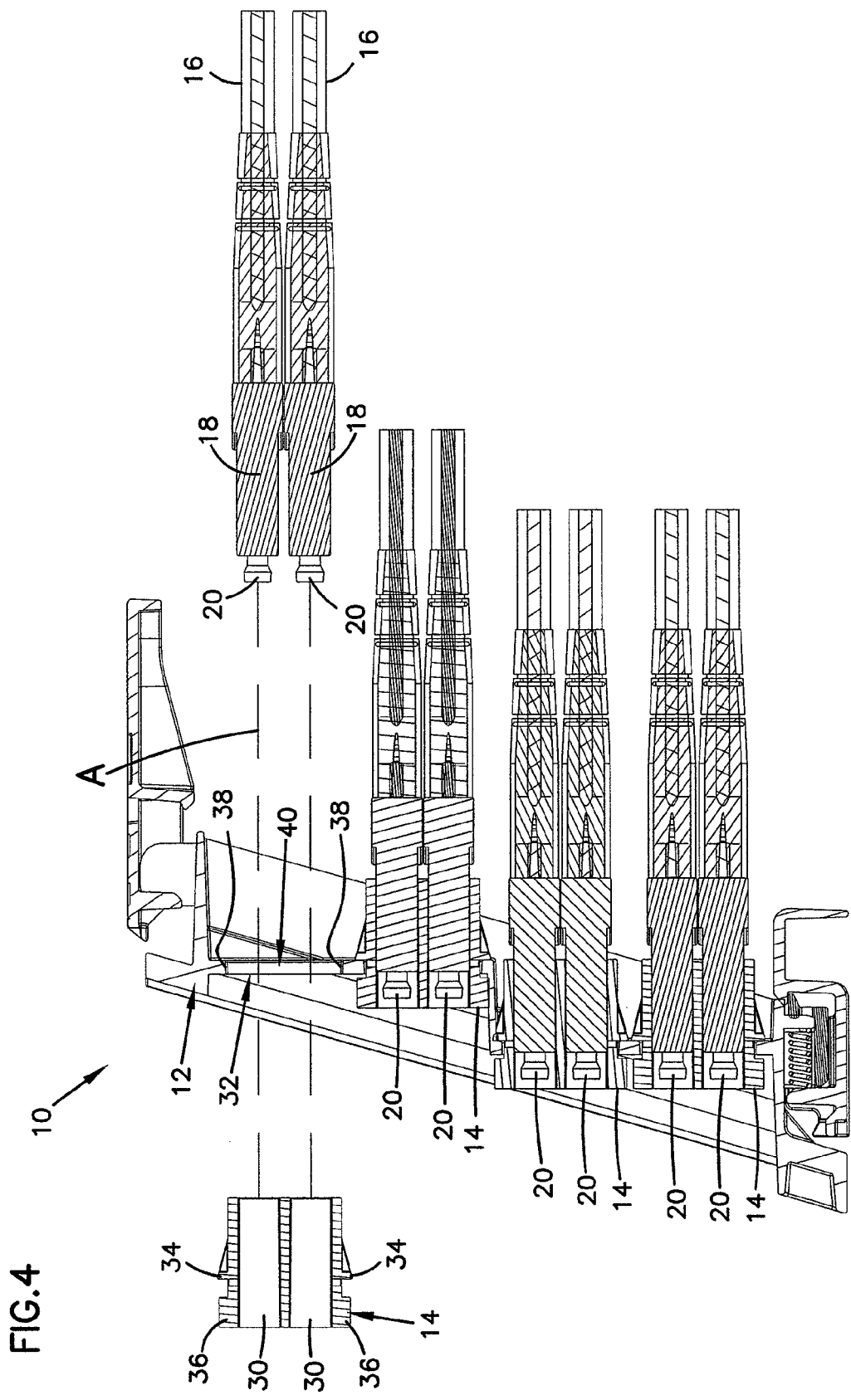

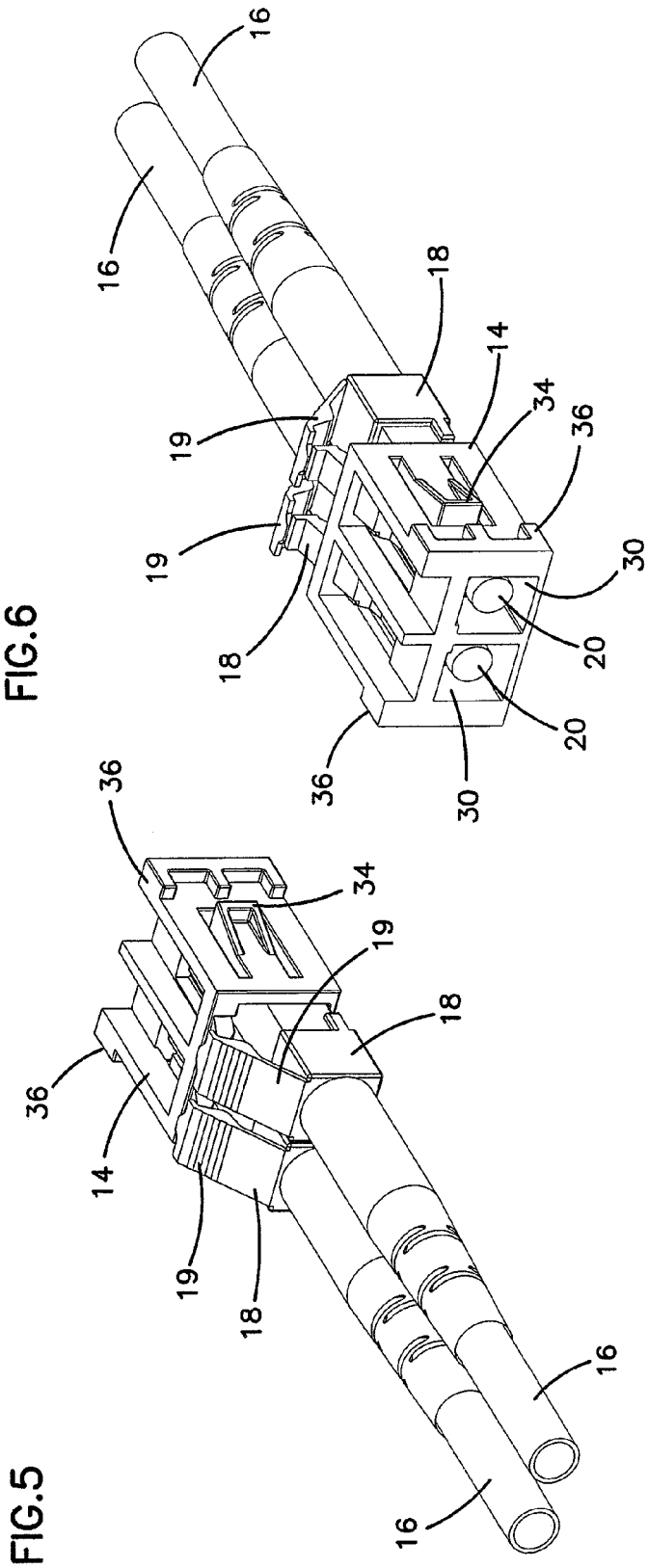

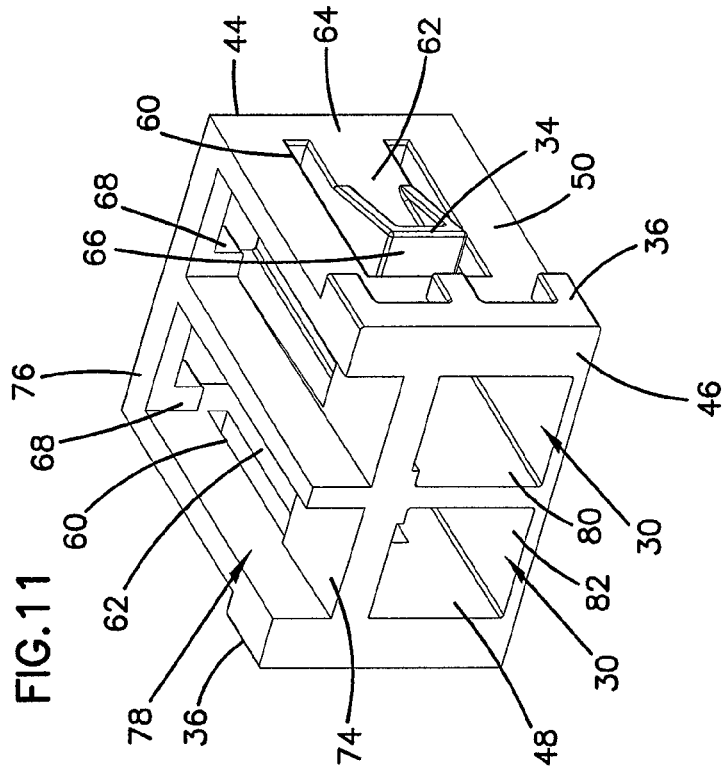
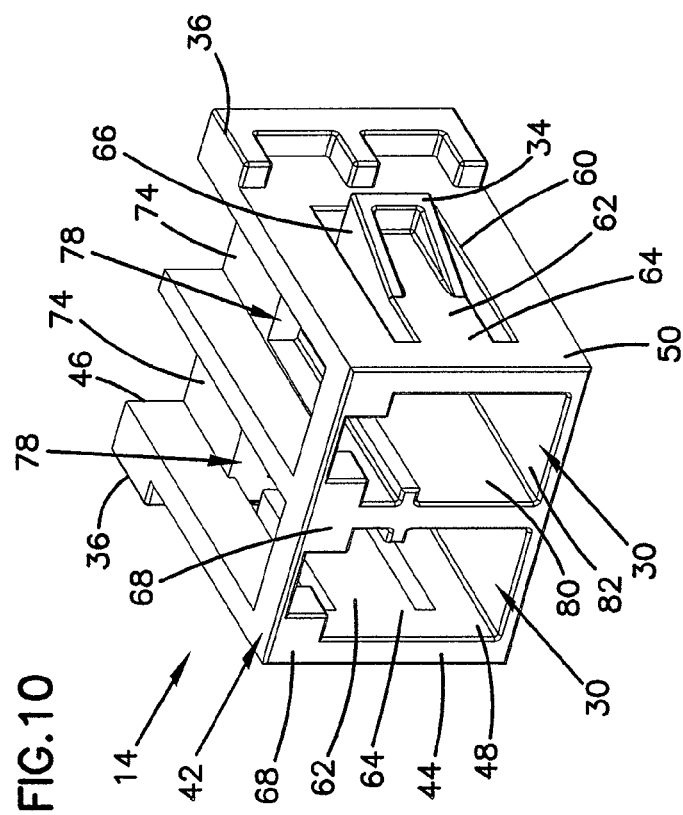

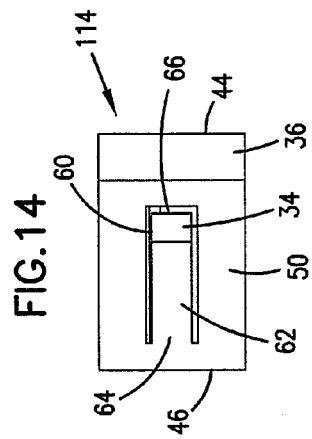
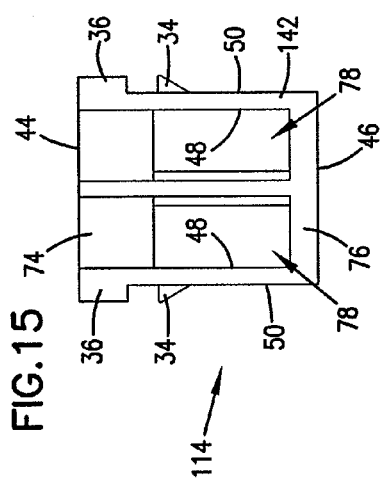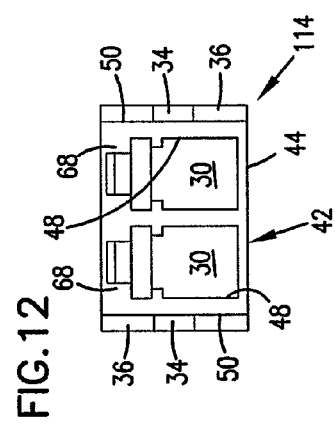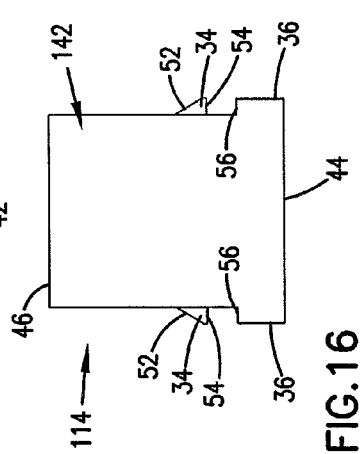
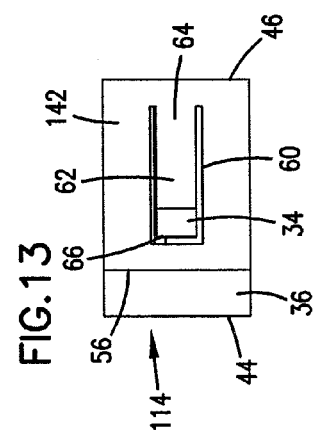

FIBER OPTIC CONNECTOR HOLDER

CROSS REFERENCE TO RELATED APPLICATIONS

This application is a continuation of application Ser. No. 11/190,511, filed Jul. 26, 2005, now U.S. Pat. No. 7,583,883, which application is incorporated herein by reference in its entirety.

TECHNICAL FIELD

The present application relates to a fiber optic connector holder for fiber optic telecommunications installations.

BACKGROUND

Installation of telecommunications equipment to support the current and potential future needs of a particular group of customers may make it desirable to install more capacity than the current customer base alone may dictate. Excess capacity may be installed to permit the easy addition of new circuits for new or existing customers. A telecommunications connection cabinet with such excess capacity may be pre-configured at a fabrication facility and installed in the field to include more circuits than are necessary to provide service to the existing customers. Prior to the linkage of these surplus or future expansion circuits to customers, it is desirable to provide for storage, organization and protection of the patch cords or other connection cables within the cabinet.

Such connection cables might include fiber optic patch cords terminated with fiber optic connectors. Fiber optic connectors include a polished end face, typically held by a ferrule, which permits positioning of the optical fiber held by the connector to receive and transmit signals another optical fiber or optical light source. It is desirable to keep these polished end faces as free of contaminants as possible to improve the transmission of light to and from the optical fiber held by the connector. Such contaminants which might adversely impact the transmission of light to and from the optical fiber include but are not limited to dust and finger prints.

Dust caps may be provided for connectors to protect the polished end face of the optical fiber. However, when such dust caps are in place, the connector is not capable of being received in known optical fiber adapters, such as those described in U.S. Pat. No. 5,317,663, and U.S. Pat. No. 6,347,888. The disclosures of these patents are incorporated herein by reference. A connector may be inserted into one of these known adapters for storage or pre-wiring of a cross-connection point, an interconnection point or some other type telecommunications switching or connection equipment with the dust cap removed. While the adapters might provide some protection from contaminants to a single connector inserted into an adapter, these adapters are not as effective as a dust cap in protecting the polished end face.

Fiber optic connector holders were disclosed in commonly-owned U.S. patent application Ser. No. 10/613,764, filed Jul. 2, 2003 and entitled Fiber to the Premise Cabinet. The disclosure of this application is incorporated herein by reference.

It is desirable to improve the known methods and apparatus for protecting the polished end face of a fiber optic connector within telecommunications equipment.

SUMMARY

The present invention relates generally to fiber optic connector holders. More specifically, the present invention relates to a fiber optic connector holder including a housing with at least one cavity for receiving a fiber optic connector with a dust cap in place about a terminal end of the connector. The housing may be integrally molded with retaining structures for releasably engaging the fiber optic connector and releasable catches for mounting the housing at a mount location. The presence of a fiber optic connector within a cavity of the housing may prevent the removal of the housing from a mounting location.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 4 is a side cross-sectional, partially exploded view of the connector holder assembly of FIG. 1.

FIG. 5 is a perspective view of a connector holder of FIG. 1, with a pair of fiber optic cables and connectors.

FIG. 6 is a second perspective view of the connector holder of FIG. 5.

FIG. 10 is a perspective view of the connector holder of FIG. 5, with the cables and connectors removed.

FIG. 11 is a second perspective view of the connector holder of FIG. 10.

FIG. 12 is an end view of an alternative embodiment of a connector holder according to the present invention.

FIG. 13 is a first side view of the connector holder of FIG. 12.

FIG. 14 is a second side view of the connector holder of FIG. 12.

FIG. 15 is a third side view of the connector holder of FIG. 12.

FIG. 16 is a fourth side view of the connector holder of FIG. 12.

DETAILED DESCRIPTION

Reference will now be made in detail to exemplary aspects of the present invention which are illustrated in the accompanying drawings. Wherever possible, the same reference numbers will be used throughout the drawings to refer to the same or similar parts.

Figure 1:
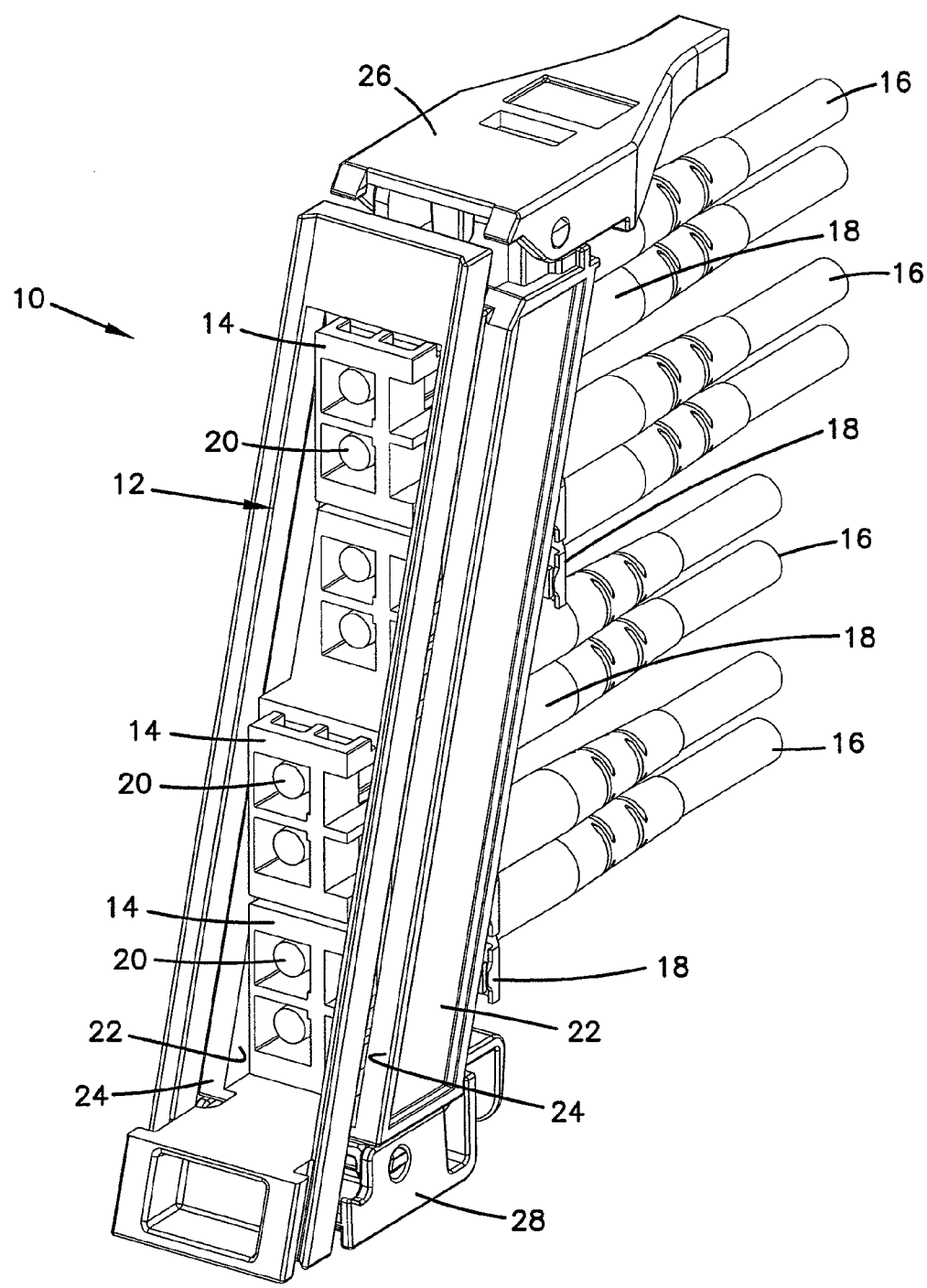
FIG. 1 is a perspective view of a connector holder assembly according to the present invention.
Figure 2:
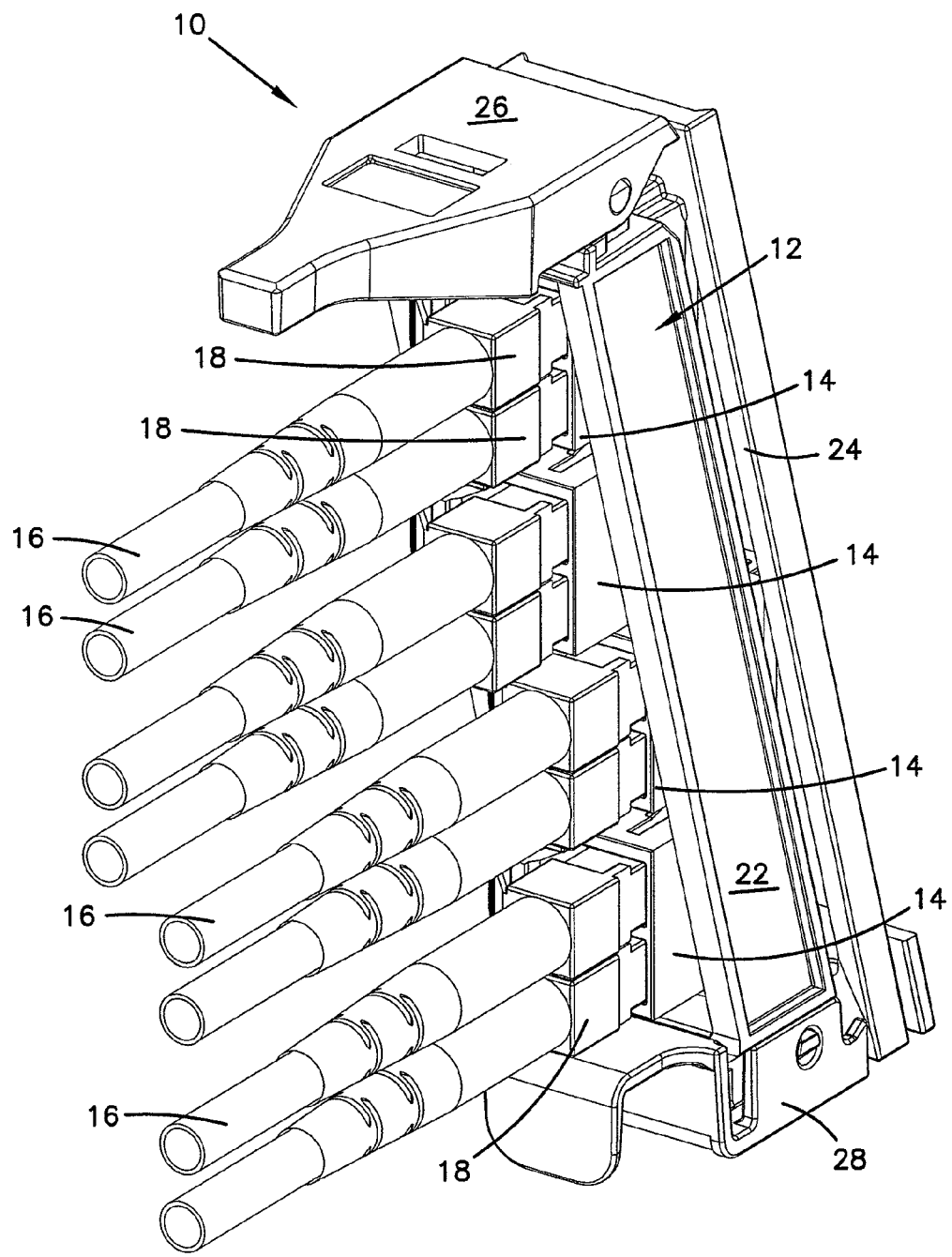
FIG. 2 is a second perspective view of the connector holder assembly of FIG. 1.
Figure 3:
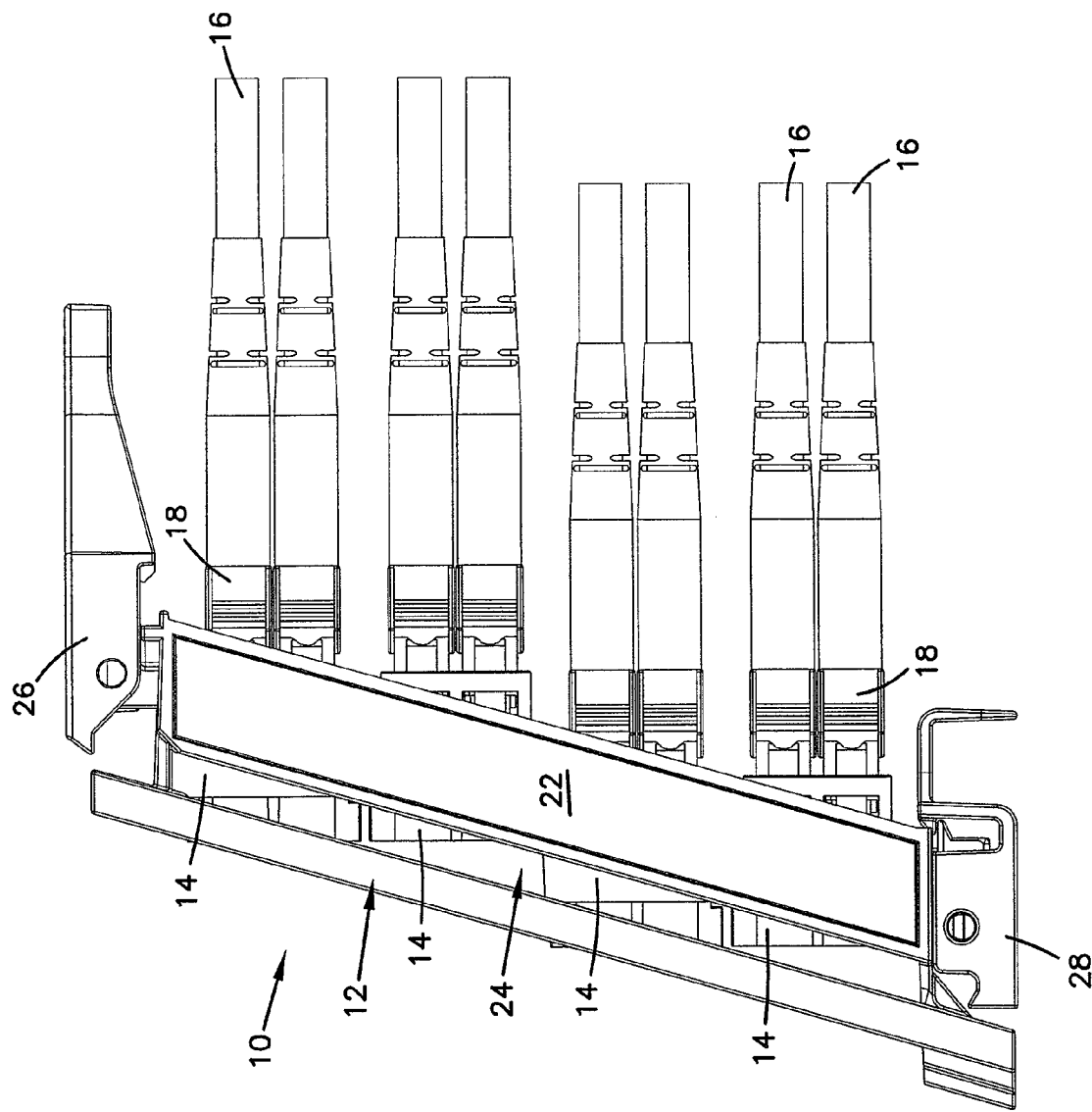
FIG. 3 is a side view of the connector holder assembly of FIG. 1.
Figure 7:
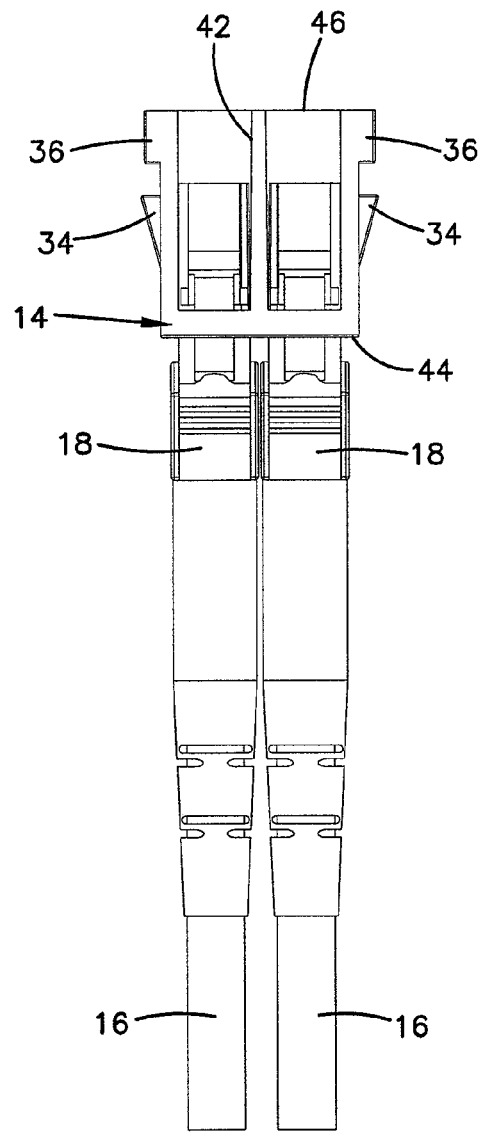
FIG. 7 is a first side view of the connector holder of FIG. 5.

Referring to FIGS. 1 to 3, a connector holder assembly or sliding adapter module 10 includes a housing 12 with a plurality of connector holders 14 mounted to housing 12. Inserted within each connector holder 12 are a pair of fiber optic cables 16, each including a connector 18 terminating the cable and a dust cap 20 mounted about a terminal end of the cable. Housing 12 includes a pair of opposing side walls 22 within each of which is formed a sliding groove 24. As shown in U.S. Pat. No. 6,591,051, issued Jul. 8, 2003, the disclosure of which is incorporated herein by reference, such grooves 24 may engage side guides for slidably mounting connector holder assembly 10 to a telecommunications device.

At the top of housing 12 is mounted a pivoting handle 26 to lift connector holder assembly 10 within the side guides and initiate and permit sliding movement of connector holder assembly 10. At the bottom of housing 12 is a slide handle or clip 28 which may operate to retain connector holder assembly 10 within the side guides in a retracted or an extended position.

As shown in FIG. 4, connectors 18 are received within a pair of cavities 30 within connector holder 14. Connectors 18 are engaged and releasably held within cavities 30 in a manner similar to the manner a known fiber optic adapter would engage connector 18. However, connector holder 14 permits the insertion of connector 18 with dust cap 20 in place about a terminal end of cable 16, and further only permits insertion of a single connector 18 within cavity 30. Known fiber optic adapters are configured to receive and optically connect two connectors 18 and cannot receive a connector 18 with a dust cap 20 in place, as shown.

Housing 12 includes a plurality of mounting locations 32 for receiving and mounting connector holders 14. As will be described further below, connector holder 14 includes a deflectable or movable mounting tab 34 and an opposing fixed mounting tab 36 on opposite sides of the connector holder. Movable tab 34 deflects inward into cavity 30 to permit passage of connector holder 14 between a pair of opposing sides walls 38 defining an opening 40 at one of the mounting locations 32. Once through opening 40 and beyond side walls 38, movable tabs 34 spring back into their original undeflected position. Side walls 38 are then trapped between tabs 34 and 36 to hold connector holder 14 at mounting location 32.

As described in the referenced patents and patent applications, mounting locations 32 may also be populated with fiber optic adapters to used in the optical connection of two optical fiber cables 16 and connectors 18. Such adapters are well known in the telecommunications industry. As shown in FIGS. 1 to 4, above, housing 12 is configured to provide a temporary holding location for fibers within a telecommunication chassis, module, rack, bulkhead, or other telecommunications device or installation. The temporary holding location permits storage of fiber 16 and connector 18 with protective dust cap 20 in place. When cable 16 is needed elsewhere for a live optical connection, connector 18 can be removed from connector holder 14, dust cap 20 removed from about the terminal end of cable 16 and cable 16 can be directed to the location where the connection is desired. When all of the cables 16 and connectors 18 have been removed from cavities 30 of a connector holder 14, the connector holder 14 may be removed from housing 12 and either discarded or saved for future use. A compatible form factor fiber optic adapter may be placed at mounting the now vacant mounting location 32.

As shown in the FIGS., above, housing 12 is generally angled from perpendicular to an axis of insertion A of connectors 18 into connector holders 14. While housing 12 is shown with two offset pairs of mounting locations 32, with each opening 40 of the pair generally aligned with each other, it is anticipated that all four mounting locations 32 may be offset from each other. Such a continual offset arrangement of connector holders 14 might generally follow the angle of housing 12. As shown in the referenced patents, housing 12 may also be configured with all the connectors holders in a line generally perpendicular to axis of insertion A.

As shown, there are four connector holders 14 providing eight cavities 30 for receiving connectors 18. Other numbers of connector holders may be provided and housing 12 extended or otherwise altered as necessary to accommodate more or fewer numbers of connector holders. Housing 12 may also be adapted to mount connector holders of difference sizes or configurations.

Referring now to FIGS. 5 to 9, connector holder 14 includes a housing 42 with a first end 44 and a second end 46. Connector 18 is inserted within cavity 30 through first end 44 and dust cap 20 mounted about the terminal end of cable 16 extends within cavity 30 to a position adjacent second end 46. Each connector 18 includes a releasable catch 19.

Figure 9:
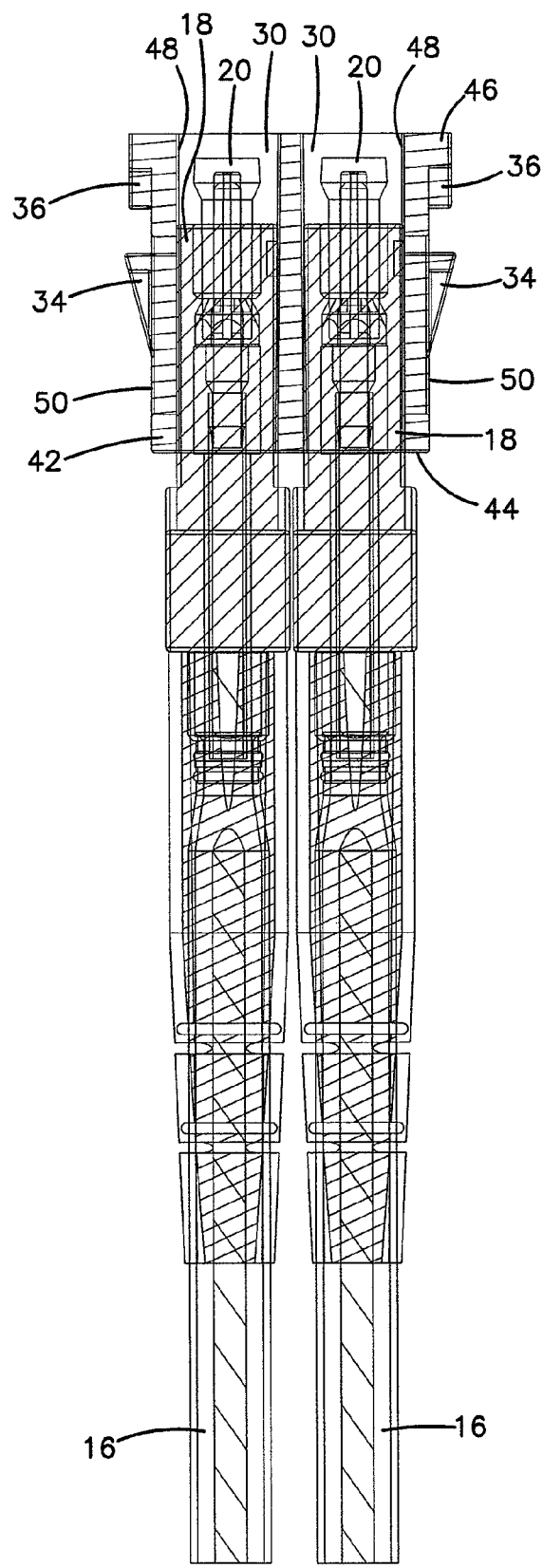
FIG. 9 is a side cross-sectional view of the connector holder of FIG. 5.

Within each cavity 30 is an inner surface 48 of an outer side 50, in which are located tabs 34 and 36. As shown in FIG. 9, when connector 18 is positioned within cavity 30, connector 18 sits in close proximity to inner surface 48 of the corresponding side 50. With one of the connectors 18 in place within cavity 30, movable tab 34 cannot be deflected inward.

Figure 8:
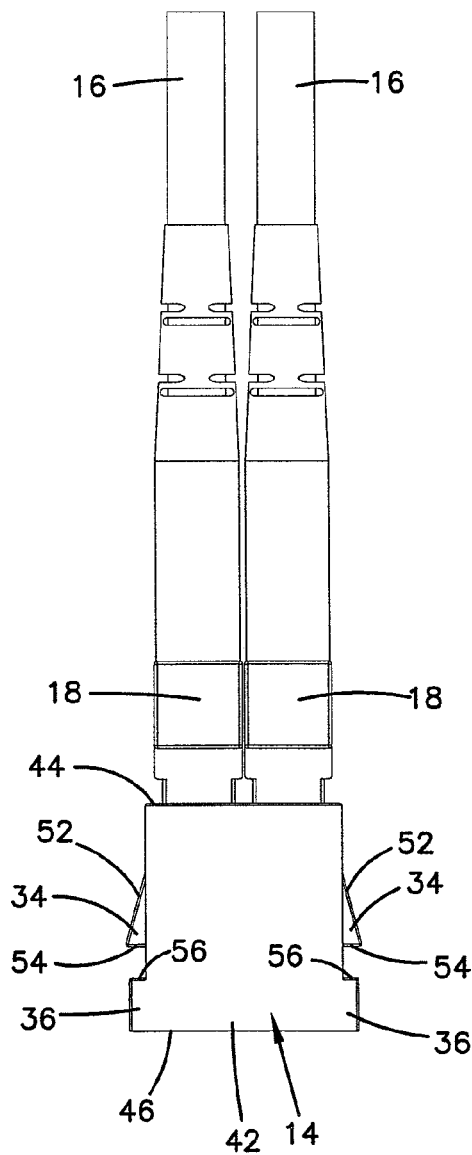
FIG. 8 is a second side view of the connector holder of FIG. 5.

As shown in FIG. 8, each tab 34 includes a ramp 34 angled toward first end 44 and a catch 54. Catch 54 is opposed by a catch 56 defined by fixed tab 36. Between catches 54 and 56, side walls 38 of opening 40 are engaged to secure connector holder 14 to mounting location 32. When connector holder 14 is positioned at one of the mounting locations 32 and connectors 18 are inserted within cavities 30, movable tab 34 cannot be deflected inward to release connector holder 14. Thus, the presence of connectors 18 within connector holder 14 provides security against accidental removal of connector holder 14 from mounting location 32.

Referring now to FIGS. 10 to 11, housing 42 includes an opening 60 in each side 50. A flexible arm 62 is attached to side 50 at a proximal end 64 and extends to a distal end 66 within opening 60. Movable tab 34 is mounted adjacent distal end 66 and deflection of flexible arm 62 into cavity 30 beyond inner surface 48 permits positioning of connector holder 14 at mounting location 32.

Each cavity 30 may also include structures 68 which engage releasable catch 19 of connector 18 to releasably secure connector 18 to connector holder 14. While connectors 18 are shown as LC format connectors and connector holder 14 is configured to releasable engage connectors of this format, it is anticipated that other brands, styles or formats of connectors and corresponding mating structures may be used on housing 42 within the scope of the present disclosure.

FIGS. 12 to 16 show a second embodiment of a connector holder 114 with a housing 142. Connector holder 114 and housing 142 are configured similarly to connector holder 14 and housing 42, with similar elements labeled with the same numbers.

As shown in FIGS. 10 to 16, above, housing 42 and 142 each include a transverse bulkhead 74 adjacent second end 46 and a transverse bulkhead 76 adjacent first end 44. An open top 78 to cavity 30 is defined between bulkheads 74 and 76. The open top of cavity 30 is provided to permit easier molding of housings 42 and 142, so that each of the housings may be integral one-piece moldings including both connector engaging structures 68 and mounting tabs 34 and 36. Bulkheads 74 and 76 provide lateral strength to housings 42 and 142 and permit the remainder of cavities 30 to have an open top. Existing adapters and connector holders may have either connector engagement structures or mounting tabs provided in separate parts of molding which are assembled to form the adapter or connector holder.

Extending between cavities 30 is a longitudinal bulkhead 80 which extends from a bottom 82 of housings 42 and 142 to at least transverse bulkheads 74 and 76.

Figure 17:
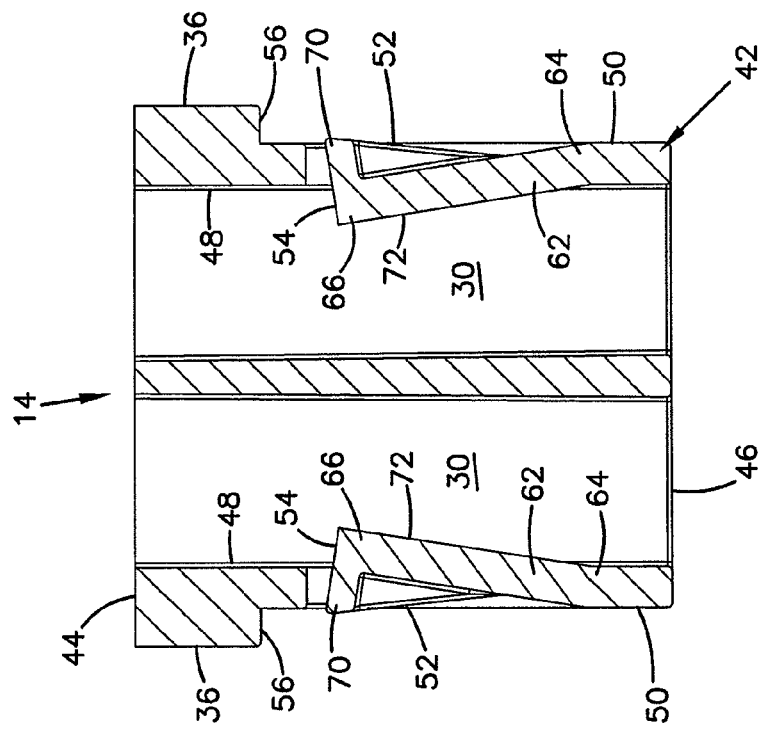
FIG. 17 is a side cross-sectional view of the connector holder of FIG. 10.
Figure 18:
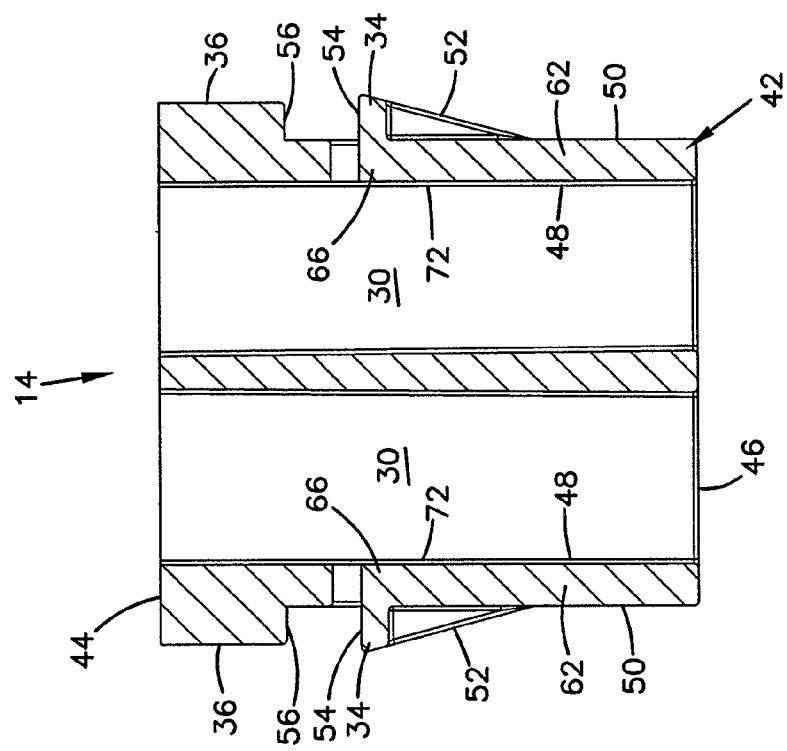
FIG. 18 is a side cross-sectional view of the connector holder of FIG. 17, with mounting tabs deflected inward for insertion at a mounting location.

The extent of deflection required to position or remove connector holder 14 at mounting location 32 is shown in FIGS. 17 and 18. As shown in FIG. 17, in an undeflected position, arm 62 is generally in line with side wall 50 so that an inner surface 72 of arm 62 is generally in line with inner surface 48. A connector 18 can be positioned or removed from cavity 30 without any interference. Catches 54 and 56 are facing each other and in position to capture sides 38 of opening 40.

To position or remove connector holder 14 at mounting location 32, movable tabs 34 are depressed inward, deflecting arms 62 about proximal end 64 so that inner surface 72 of arm 62 is positioned inwardly from inner surface 48 of wall 50 into cavity 30. Such deflection would not be possible with a connector 18 within cavity 30. With movable tab 34 depressed inwardly enough so that an outermost extension 70 generally aligned with wall 50, side 38 of opening 40 can be removed from or placed between catches 54 and 56. Arms 62 are preferably made of a resilient deformable material that will return to the undeflected location shown in FIG. 17 after being depressed to the deflected location shown in FIG. 18.

It is anticipated that a mounting location for connector holder 14 may be defined in a variety of locations, wherever temporary storage of a connector with a protective dust cap in place may be desired. The configuration of connector holder 14 (and 114) provides security against accidental removal from a mounting opening when connectors are positioned within cavities 30, so that equipment with such connector holders may provide control of preinstalled cables in telecommunications equipment during transport, handling, installation, or environmental disturbances.

It is anticipated that connector holders and mounting locations according to the present disclosure may be incorporated into bulkheads which are part of telecommunications equipment, such as that described in U.S. Pat. No. 6,556,763, issued Apr. 29, 2003, the disclosure of which is incorporated herein by reference. It is also anticipated that connector holders and mounting locations according to the present invention may be incorporated into drawers which are part of telecommunications equipment, such as that described in U.S. Pat. No. 6,504,988, issued Jan. 7, 2003, and in commonly-owned U.S. patent application Ser. No. 09/900,465, filed Jul. 6, 2001, the disclosures of which are incorporated herein by reference.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber optic connector holder comprising:
a housing including a pair of opposing sides extending between first and second ends and at least one transverse member connecting the opposing sides to define at least a first cavity, the first cavity being sized and configured to receive a fiber optic connector, at least a first of the opposing sides defining an opening to the first cavity;
an arm extending from a first end to a second end, the first end of the arm being arranged on the first side of the housing at the opening, the second end of the arm being configured to flex from an undeflected position external of the first cavity to a deflected position in which the arm extends through the opening and into the first cavity.

2. The fiber optic connector holder of claim 1, wherein the first end of the housing includes a retaining structure that is configured to releasably engage the fiber optic connector when the fiber optic connector is positioned within the first cavity.

3. The fiber optic connector holder of claim 1, wherein the housing is an integrally molded housing.

4. The fiber optic connector holder of claim 1, wherein the housing includes a second transverse member connecting the opposing sides, the second transverse member cooperating with the first transverse member to define an open top of the housing.

5. The fiber optic connector holder of claim 1, further comprising a fixed tab arranged on the first side of the housing, the fixed tab defining a first catch surface.

6. The fiber optic connector holder of claim 5, wherein the arm includes a second catch surface that generally opposes the first catch surface on the fixed tab when the arm is arranged in the undeflected position.

7. The fiber optic connector holder of claim 1, wherein at least a portion of the arm defines a ramped surface relative to the first side of the housing.

8. The fiber optic connector holder of claim 1, wherein the first cavity is sized and configured to receive the fiber optic connector with a dust cap mounted over a ferrule of the fiber optic connector.

9. The fiber optic connector holder of claim 1, wherein the housing defines a second cavity that is sized and configured to receive a fiber optic connector.

10. The fiber optic connector holder of claim 9, wherein the housing includes a longitudinal member extending between the first and second ends, wherein the housing defines the first cavity between the longitudinal member and the first side of the housing and defines the second cavity between the longitudinal member and a second of the opposing sides of the housing.

11. The fiber optic connector holder of claim 10, wherein each cavity is sized and configured to receive the fiber optic connector with a dust cap mounted over a ferrule of the fiber optic connector.

12. The fiber optic connector holder of claim 9, wherein a second of the opposing sides of the housing defines a second opening to the second cavity; and wherein the fiber optic connector holder further comprises a second arm extending from a first end to a second end, the first end of the second arm being arranged on the second side of the housing at the second opening, the second end of the second arm being configured to flex from an undeflected position external of the second cavity to a deflected position in which the second arm extends through the second opening and into the second cavity.

13. A fiber optic connector holder assembly comprising:
an assembly housing defining a plurality of mounting locations, each mounting location including an opening defined by a pair of opposing side walls and by a pair of opposing end walls, each of the end walls including a flange that extends into the opening of the mounting location;
at least a first connector holder configured to mount within the opening of a first of the mounting locations of the assembly housing, the first connector holder including a housing that defines at least a first cavity and that includes at least a first flexible tab and a first fixed tab, the housing being configured to mount to the first mounting location by trapping the flange of a first of the end walls between the first flexible tab and the first fixed tab, the first flexible tab being configured to move at least partially into the first cavity to enable the first flexible tab to slide past the flange.

14. The fiber optic connector holder assembly of claim 13, wherein the first connector holder also includes a second flexible tab and a second fixed tab that are configured to trap therebeween the flange of a second of the end walls of the first mounting location to mount the first connector holder to the first mounting location.

15. The fiber optic connector holder assembly of claim 14, wherein the first connector holder also defines a second cavity, wherein the second flexible tab is configured to move at least partially into the second cavity to enable the second flexible tab to slide past the flange of the second end wall of the first mounting location.

16. The fiber optic connector holder assembly of claim 13, further comprising a second connector holder configured to mount within the opening of a second of the mounting locations of the assembly housing.

17. The fiber optic connector holder assembly of claim 16, wherein the second mounting location defined by the assembly housing is arranged offset from the first mounting location.

18. The fiber optic connector holder assembly of claim 13, further comprising a first fiber optic connector including a ferrule and a dust cap mounted about the ferrule, the first fiber optic connector being mounted within the first cavity of the first connector holder.

19. The fiber optic connector holder assembly of claim 18, wherein the first fiber optic connector inhibits the first flexible tab from moving into the first cavity.

20. The fiber optic connector holder assembly of claim 18, wherein the first connector holder includes a retaining structure at a first end of the connector holder, wherein the first fiber optic connector entered the first cavity through the first end, and wherein the first fiber optic connector includes a releasable catch that is configured to engage the retaining structure of the first connector holder.

* * * * *